United States Patent
Drake et al.

(10) Patent No.: US 7,917,396 B1
(45) Date of Patent: Mar. 29, 2011

(54) METHOD AND SYSTEM FOR PROCESSING COMMUNICATIONS ORDERS

(75) Inventors: Peter J. Drake, Mansfield, OH (US);
Lisa K. McLellan, Belton, MO (US);
George E. Metz, Mansfield, OH (US)

(73) Assignee: Embarq Holdings Company, LLC, Overland Park, KS (US)

( * ) Notice: Subject to any disclaimer, the term of this patent is extended or adjusted under 35 U.S.C. 154(b) by 974 days.

(21) Appl. No.: 11/058,470

(22) Filed: Feb. 15, 2005

(51) Int. Cl.
*G06Q 30/00* (2006.01)

(52) U.S. Cl. ............ 705/26; 705/27; 379/119; 709/203; 709/238; 370/502; 370/353

(58) Field of Classification Search .................. 379/119; 705/26, 27; 709/203, 238; 370/502, 353
See application file for complete search history.

(56) References Cited

U.S. PATENT DOCUMENTS

| | | | |
|---|---|---|---|
| 6,480,898 B1 * | 11/2002 | Scott et al. ..................... | 709/238 |
| 6,581,827 B2 * | 6/2003 | Welton .......................... | 235/380 |
| 6,650,901 B1 * | 11/2003 | Schuster et al. ........... | 455/456.1 |
| 6,668,046 B1 * | 12/2003 | Albal ............................. | 379/119 |
| 6,816,865 B2 * | 11/2004 | O'Brien et al. ............... | 707/100 |
| 6,937,593 B1 * | 8/2005 | Gunasekar et al. ........... | 370/352 |
| 6,963,557 B2 * | 11/2005 | Knox ............................. | 370/352 |
| 7,123,608 B1 * | 10/2006 | Scott et al. ..................... | 370/353 |
| 7,149,474 B1 * | 12/2006 | Mikhak ......................... | 455/41.2 |
| 7,203,658 B1 * | 4/2007 | Gidwani et al. ................ | 705/26 |
| 7,346,043 B1 * | 3/2008 | Olshansky et al. ........... | 370/352 |
| 7,457,279 B1 * | 11/2008 | Scott et al. ..................... | 370/352 |
| 7,486,662 B2 * | 2/2009 | Sorrentino .................... | 370/352 |
| 7,596,612 B1 * | 9/2009 | Islam et al. .................... | 709/223 |
| 7,627,338 B2 * | 12/2009 | Hicks et al. ................ | 455/552.1 |
| 7,653,730 B1 * | 1/2010 | Hoffman et al. .............. | 709/227 |
| 2001/0050911 A1 * | 12/2001 | Eastman ........................ | 370/352 |
| 2006/0078095 A1 * | 4/2006 | Crago et al. .................... | 379/45 |

FOREIGN PATENT DOCUMENTS

EP 1585263 * 5/2005

OTHER PUBLICATIONS

Kelly, Brian, Northern New York fiber optic network two weeks from launch, Knight Ridder, Oct. 5, 2004.*
Sipe, Steven, "XML gets down to business", PC Magazine, Aug. 1, 2000.*

* cited by examiner

*Primary Examiner* — Mark Fadok
(74) *Attorney, Agent, or Firm* — SNR Denton US, LLP

(57) ABSTRACT

A method, system, and medium are provided for processing customer orders associated with providing telephony services via a telecommunications network and with services provided via a cable network. In one embodiment, the method includes providing a service-order-entry (SOE) system associated with a set of legacy components, the SOE system being operable to receive a first type of customer order that is associated with providing services via a telecommunications network, the telecommunications network not including a cable television (CATV) network; supplementing the SOE system with a secondary order-reception system operable to receive a second type of customer order that is associated with providing telephony services over a CATV network and further operable to receive the second type of customer order without substantially modifying the legacy components; receiving the second type of customer order; and fulfilling the second type of customer order without substantially modifying the legacy components.

15 Claims, 11 Drawing Sheets

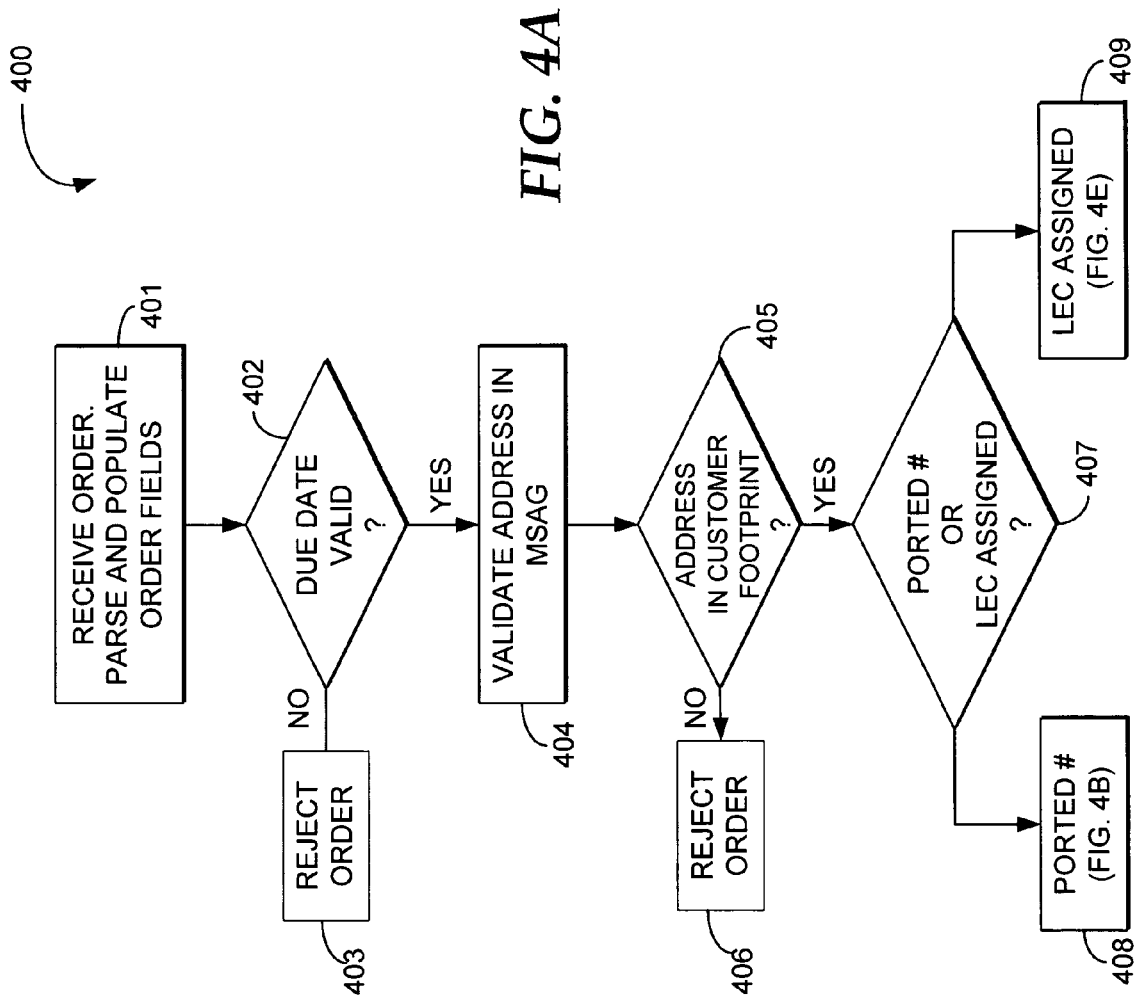

METHOD AND SYSTEM FOR PROCESSING COMMUNICATIONS ORDERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Telecommunications-network usage is constantly expanding, and with the addition of a new application comes challenges to the way in which customers requests are handled. Existing or legacy programs must meet these challenges in short order with minimal changes.

With the introduction of VoIP/VOP ("Voice over Internet Protocol" or more generally "Voice Over Protocol," which includes ATM, etc.), cable providers desire to provide telecommunications-type services over a CATV network. It is desirous to route calls through switches run by Local Exchange Carriers (LECs). The LECs must be able to connect and handle these calls seamlessly, as well as bill appropriately for these calls. That is, if telephony services are being offered to customers by a first party (such as a CATV provider), but technologically provided by a telecommunications carrier, the customer orders will need to be processed by the telecommunications carrier but billed to the customer by the CATV provider. With portability, much of the information associated with a telephone number can change, therefore it is important that this information be kept current. Thus, when a subscriber requests service through a cable partner, the cable partner must submit an order to the LEC to make changes.

Many barriers are present today that would make it difficult implementing the model discussed above. For example, when the LEC's market and the cable partner's market overlap, an "In-territory" problem occurs because the end-customer is in the market territories of both the CATV provider and telecommunications company. Absent the present invention, the legacy system would try to handle such a customer as if it were the LECs customer, and thereby try to bill the end-customer as a customer of the LEC (instead of the third-party's customer). Alternatively, it would reject a service order by the cable partner for this customer because it would treat such a record as a duplicate. Another illustrative problem exists in handling data and data types that differ from those expected, for example, accepting alpha-numeric characters in data fields where traditionally only numeric data have been used or adding new data to be processed.

Overhauling or replacing legacy systems so that these problems could be remedied require significant programming effort, data reformatting, time, resources, and expense. With the rapid changes in the industry, the need exists for service order entry systems to be flexible, and able to adapt quickly and effortlessly to change.

SUMMARY OF THE INVENTION

The present invention solves at least the above problems by providing a system and method that is flexible and useable. This invention solves the problem by providing a system which can quickly adapt to accepting orders for geographical markets whose data needs cannot be met by legacy systems without enhancement. The invention allows an administrator-developer to quickly alter the behavior of the application or the parameters for stored data to meet the needs of new markets and new partners.

The present invention has several practical applications in the technical arts including offering an interface that is of an improved form, flexibility, and usability. Moreover, it allows viewing of all related order information and full history data from within any page which refers to an order through the use of CSS layers. It allows for quick adaptation of data fields, and easily expandable National Emergency Number Association-2 (NENA-2) 512-Byte file generation capabilities meet the varying needs in new markets and when dealing with new Incumbent Local Exchange Carriers by containing virtually all business logic within scripted classes and functions. A litany of other practical applications are offered by the present invention, but the selected few above are included as examples only.

In one aspect, an embodiment of the present invention allows administrator-users to add new geographic areas and define new NENA-2 filetype filters. The inability of the service-order-entry system to handle data types that differ from those expected without significant programming effort is a limitation which is solved through this invention. The invention uses scripted verification code to ensure data legitimacy which allows for quick alterations to input data requirements without the need to rework data already stored within the database.

In another aspect, an embodiment of the present invention is a computer-implemented method for processing customer orders associated with providing telephony services via a telecommunications network and with services provided via a cable network. The method includes providing a service-order-entry (SOE) system associated with a set of legacy components. The SOE system is operable to receive a first type of customer order that is associated with providing services via a telecommunications network, the telecommunications network not including a cable television (CATV) network. The method continues by supplementing the SOE system with a secondary order-reception system operable to receive a second type of customer order that is associated with providing telephony services over a CATV network and further operable to receive the second type of customer order without substantially modifying the legacy components; receiving the second type of customer order; and fulfilling the second type of customer order without substantially modifying the legacy components.

In a final illustrative aspect, a method is provided for a telecommunications carrier having a legacy order-processing system to process customer orders associated with providing telephony services via a cable TV (CATV) network. The method includes receiving an indication for a request to provide or modify a voice-over-protocol telephony service; determining whether the order is associated with offerings to be provided in connection with the CATV network; if the order is associated with offerings to be provided in connection with the CATV network, then directing the order to a supplementary processing system that is coupled to the legacy order-processing system, thereby enabling the order to be received while substantially keeping in place the legacy order-processing system; and satisfying the order via the supplementary processing system.

BRIEF DESCRIPTION OF THE SEVERAL VIEWS OF THE DRAWINGS

The present invention is described in detail below with reference to the attached drawing figures, which are incorporated by reference herein and wherein:

FIGS. 4A-4G are flow diagrams depicting more detailed functional steps offered by an exemplary embodiment of the present invention.

DETAILED DESCRIPTION OF THE INVENTION

Figure 1:
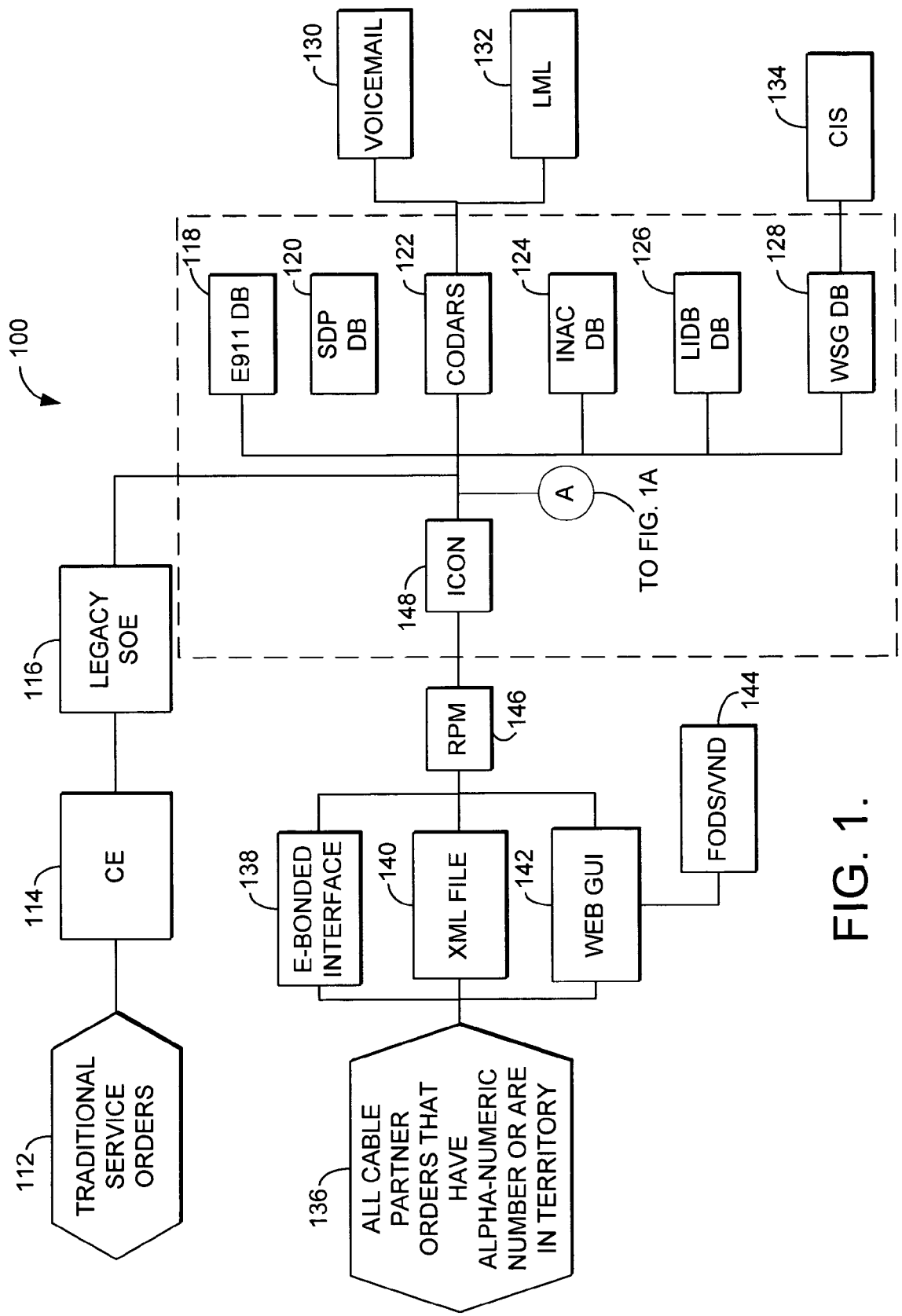
FIG. 1 is a flow diagram depicting an exemplary embodiment of the present invention for processing customer orders associated with providing telephony services via a telecommunications network and with services provided via a cable network.

An embodiment of the present invention provides a system and method for recording, directing, and controlling the process flow of orders received from Voice Over Protocol ("VOP") (including VOiP, VOATM, and other packet-based technologies) provider partners through interdepartmental, system, and functional boundaries. Flexibility and scalability are made available to meet the immediate and unexpected varying needs within the VOP market through a structure which enables easy integration with other system and process flow control applications as well as the ability to feed data directly into databases and data warehouses. A change that, in the past, required extensive programming and data change can now by achieved by changing one line of code or script.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| ALI | Automatic Location Identification |
| CATV | Cable TeleVision |
| CDR | Call Detail Record |
| CE | Computing Environment |
| CHG | Change |
| CLEC | Competitive Local Exchange Carrier |
| CLLI | Common Language Location Identifier |
| CRB | Customer Records & Billing |
| CSR | Customer Service Request |
| CSS | Cascading Style Sheets |
| DB | Database |
| DSR | Directory Service Request |
| FOC | Firm Order Confirmation |
| ICON | ILS Cable Order Notification |
| ILS | Integrated Local Services |
| INAC | Intelligent Network Administration Center |
| IVR | Interactive Voice Response |
| LEC | Local Exchange Carrier |
| LIDB | Line Information Database |
| LSP | Local Service Answering Point |
| LSR | Local Service Request |
| MSAG | Master Street Address Guide |
| NCPC | National CLEC Provisioning Center |
| NENA | National Emergency Number Association |
| NGVN | Next Generation Virtual Network |
| NPAP | Number Portability Administration and Provisioning |
| OCN | Operating Company Number |
| PLP | Physical Layer Provisioning |
| PSAP | Public Service Answering Point |
| SLA | Service Level Agreement |
| SMG | Service Management Gateway |
| SOE | Service Order Entry |
| SPID | Service Provider Identification |
| SUP 1 | Supplemental Order 1 |
| SUP 2 | Supplemental Order 2 |
| SUP 3 | Supplemental Order 3 |
| TN | Telephone Number |
| TNANI | Telephone Number and Network Inventory |
| VND | Vacant Number Database |
| XML | Extensible Markup Language |

Further, various technical terms are used throughout this description. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring now to FIG. 1, a flow diagram 100 depicts elements of an exemplary method in accordance with an embodiment of the present invention for processing customer orders associated with providing telephony services via a telecommunications network and with services provided via a cable network. Reference numeral 112 indicates a possible path for a traditional service order. A "traditional service order (or request)" includes any order that can be accepted by the legacy system without modifying the order or the legacy system. In one embodiment, a traditional service request may be entered into a front-end computing environment (CE) and is fed into the service-order-entry system 116 which would parse the request, and put the data in the proper databases to be processed by the proper legacy functions in 118 to 134 to process the order. Each database (118-128) is associated with a corresponding queue that is not shown so as to not obscure the present invention.

Reference numeral 136 indicates a possible path for non-traditional orders, such as cable-partner orders, or orders that require formatting or are otherwise incompatible with the legacy system. For example, one element of incompatibility would include an order having alpha-numeric numbers in its territory. These can be received via an E-Bonded Interface 138, XML file 140, or WEB GUI 142. In one embodiment the request can be parsed and the request data inserted into the corresponding fields in the database by a Robust Provisioning Mechanism (RPM) 146. FODS/VND 144 is a legacy system containing a vacant number database which the WEB GUI accesses to validate numbers sent by the cable partner or to allow a cable partner to select a vacant number. The ICON system 148, an order-processing system invokes the proper functions such as shown in numeral 118 to 134 to complete the request.

Figure 1A:
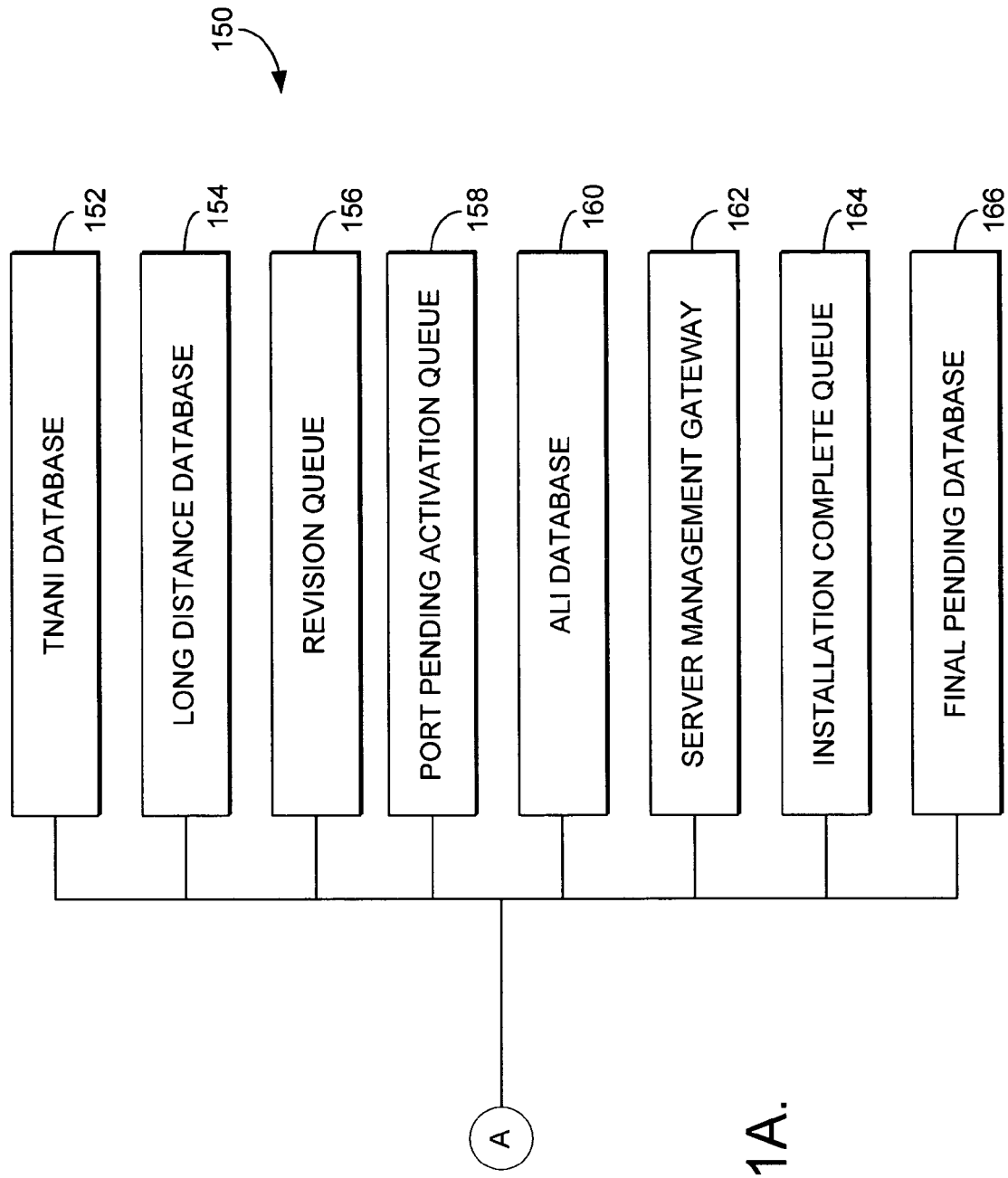
FIG. 1A is an illustration of an exemplary embodiment of a logical connection between ICON and some legacy components.

Turning now to FIG. 1A, an illustration 150 of an exemplary embodiment of a logical connection between ICON 148 and a Telephone Number and Number Element Inventory TNANI Database 152, a Long Distance Database 154, a Revision Queue 156, a Port Pending Activation Queue 158, an Automatic Line Identification (ALI) Database 160, a Server Management Gateway 162, an Installation Complete Queue 164, and a Final Pending Database. As shown by FIG. 1, ICON 148 also connects physically to other elements as described above.

Figure 2:
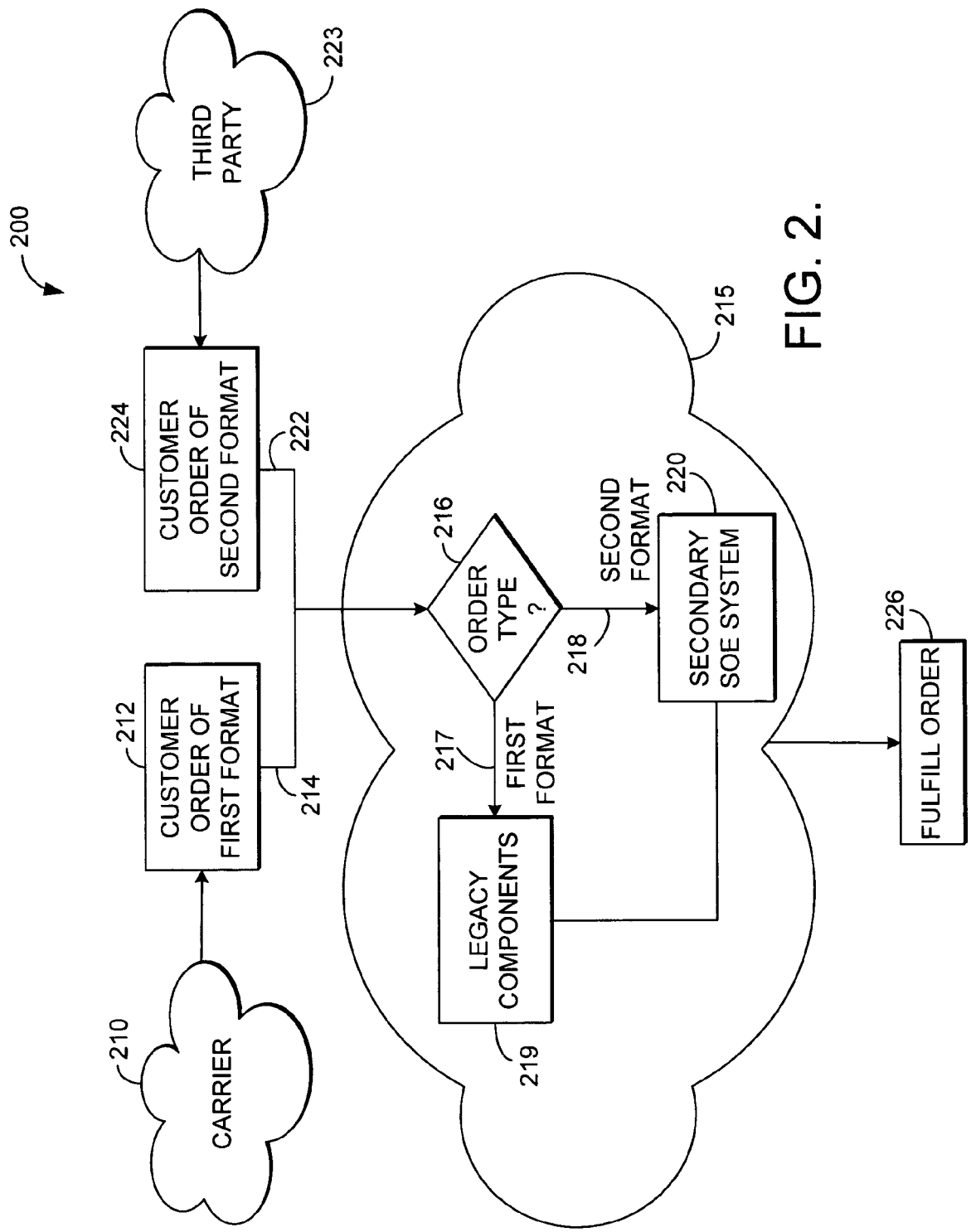
FIG. 2 is an illustration of an exemplary embodiment of a service-order-entry system comprised of legacy components supplemented by a secondary service-order-entry system in accordance with the present invention.

Referring to FIG. 2, an illustration 200 of an exemplary embodiment of a service-order-entry system comprised of legacy components supplemented by a secondary service-order-entry system in accordance with the present invention is depicted. A first order of a first format 212 associated with a carrier 210 is received at a step 214 by an overall service system 215, composed of legacy components 219 supplemented by a secondary service-order-entry system 220, which can also receive at a step 222, a second order of a second format 224 that would be otherwise incompatible with only legacy components 219. The service-order-entry system 215 determines the order type at step 216 and advances the order to the legacy system 219 through step 217 for orders of the first format 212, or to the secondary service-order-entry system 220 through step 218 for orders of the second format 224. The second order having a second format 224 is associated with a third party 223. This third party may be, for example, a service provider that provides services via a cable-TV network. The fields of second order 224, may for instance, be of a type incompatible with legacy components 219; for example, they may include alpha-numeric characters where as, legacy components 219 are configured to receive data of a numeric format only. The second order 224 may be of a type associated with a Voice-over protocol service including VOiP, VOATM, and other packet-based technologies. At a step 226 the order 212 or 224 is fulfilled by the service-order-entry system 215.

Figure 3:
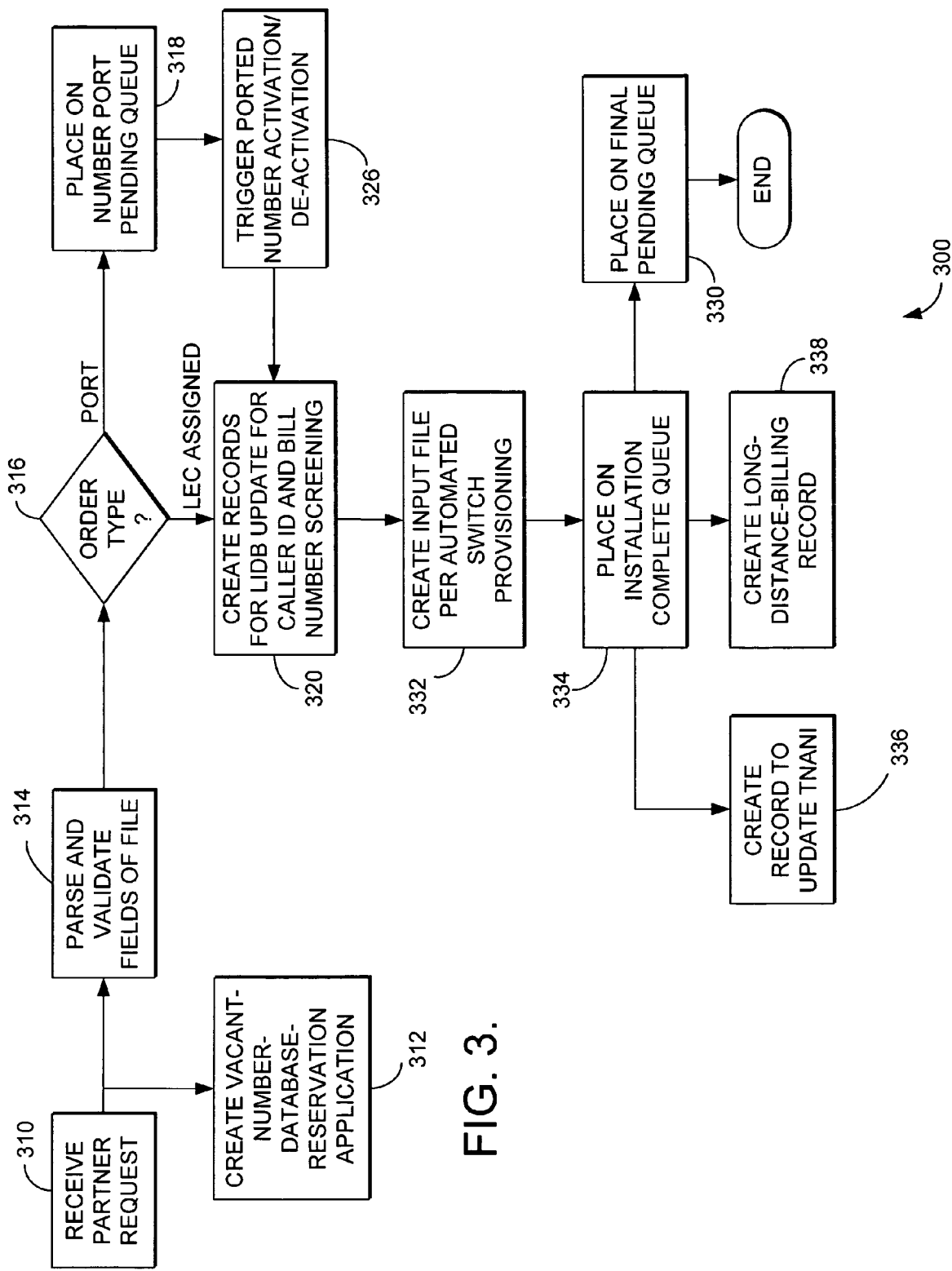
FIG. 3 is a flow diagram depicting a method in accordance with the present invention for processing customer orders associated with providing telephony services via a telecommunications network and with services provided via a cable network.

Turning now to FIG. 3, a flow diagram 300 depicts in greater details an illustrative path of a cable-partner request. At a step 310, a service request is received from a partner, such as a cable partner. In an embodiment, the request may be received by an E-Bonded interface 138, via XML file 140, or through WEB GUI interface 142. At a step 312, an application is made for a Vacant-Number-Database reservation. At a step 314, the fields of the service are validated and parsed. One layer of validation occurs with validating the received service request against E911 MSAG ("Master Street Address Guide") 118 to determine whether the address comports with the E911 requirements. At a step 316, the determination is made as to the type of order. If the order is of type "PORT," then processing advances to a step 318. If order is of type "LEC ASSIGNED," then processing advances to a step 320. If the service request is determined at step 316 to be a "PORT" type, then the request is routed to Port-Pending Queue 158 at a step 318. Based on entry into the Port-Pending Queue 158, the ported number is activated or deactivated at a step 326. Following step 326, processing continues at a step 320.

At a step 320, records are created for the Line Information Database (LIDB) 126 update with customer name for Caller ID and Bill-Number screening. At a step 332, an input file is created to enable switch provisioning. At a step 334, the request is routed to the Installation Complete Queue 164. At step 334, in one embodiment, a group of actions happen substantially in parallel: a record is created to update the Telephone Number and Network Element Inventory 152 at a step 336, a long-distance-billing record in the long distance database 154 is created at a step 338, and the service request is routed to Final Pending Database 166 at step 330.

Figure 4B:
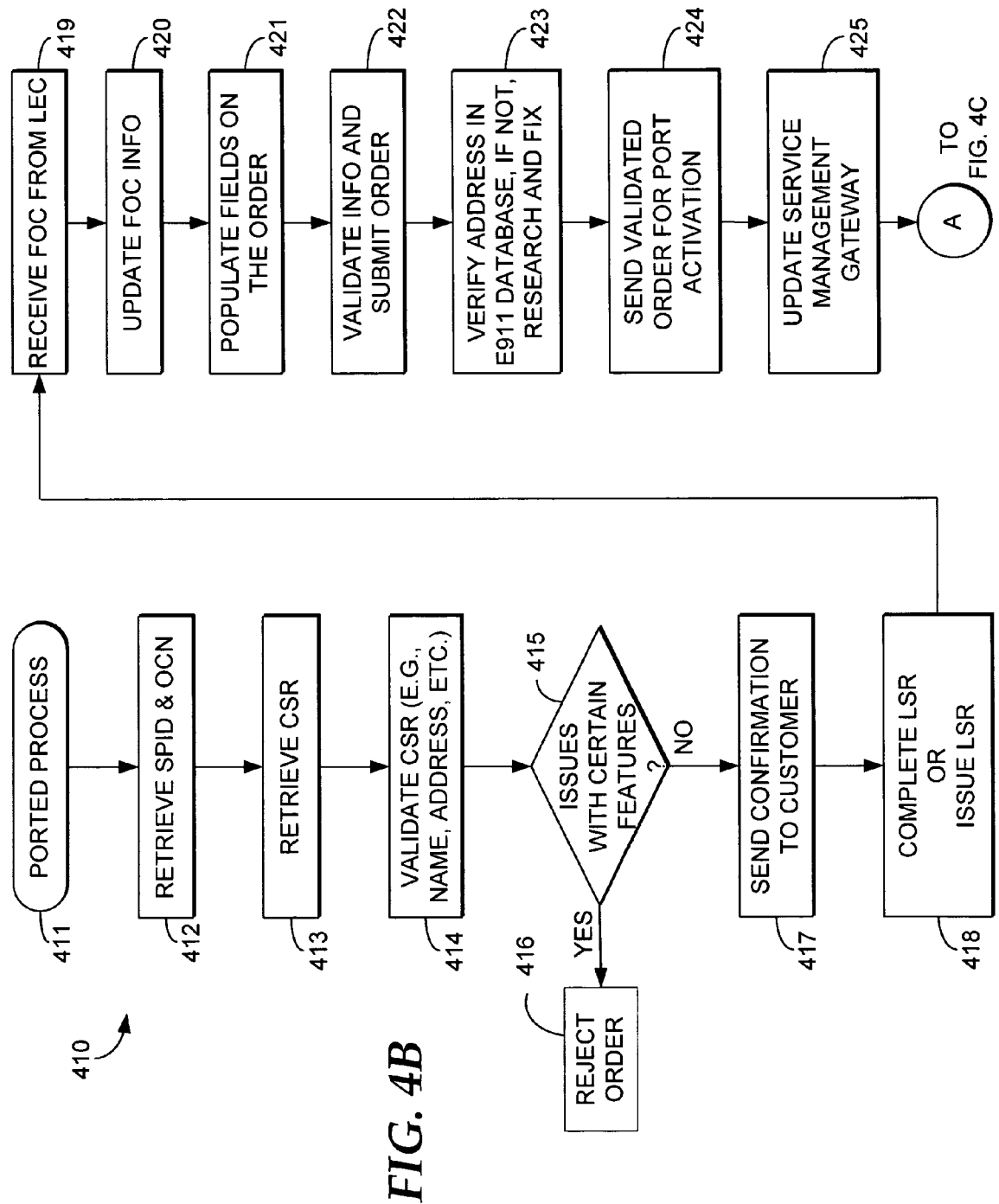

Referring now to FIG. 4A, a flow diagram 400 depicts an illustrative request for a new install ported-in number from a cable partner in accordance with an embodiment of the present invention. At a step 401, the request is received. The due date is validated at a step 402, and if it is not within established Service Level Agreement (SLA) then the order is rejected as shown at a step 403. If the order is within the established SLA then the address is validated in the E911 Master Street Address Guide (MSAG) 118 at a step 404. If the address is not within the customer's footprint as is determined at a step 405 then the order is rejected as shown at a step 406. If the order is in the customer's footprint then it is determined at a step 407 whether it is a LEC assigned number or ported number and processing is transferred as shown at a step 408 for ported in numbers and at a step 409 for LEC assigned numbers. Process control for a ported number is shown in FIG. 4B and begins at a step 411. Process control for LEC-assigned numbers is shown in FIG. 4E and begins at a step 467.

Turning now to FIG. 4B, a flow diagram 410 illustrates a ported process in accordance with an embodiment of the present invention. A step 411 is the beginning of the process. At a step 412, the service provider is identified. At a step 413 the type of request is identified and validated at a step 414. If there are any issues with the request as is determined at a step 415, the order is rejected as shown at a step 416. If there are no issues with the request, then an order confirmation is sent to the customer at a step 417. A local service request is completed and issued at a step 418. A Firm Order Confirmation (FOC) is received at a step 419, and the information from the FOC is updated at a step 420 and sent back to the customer. The fields of the order are populated at a step 421, the data is validated, and the order is submitted in step 422. The address is then verified in the E911 Master Street Address Guide (MSAG) 118 at a step 423 and corrected if it is not valid. The validated order is sent for port activation at a step 424, and Service Management Gateway 162 is updated at a step 425.

Figure 4C:
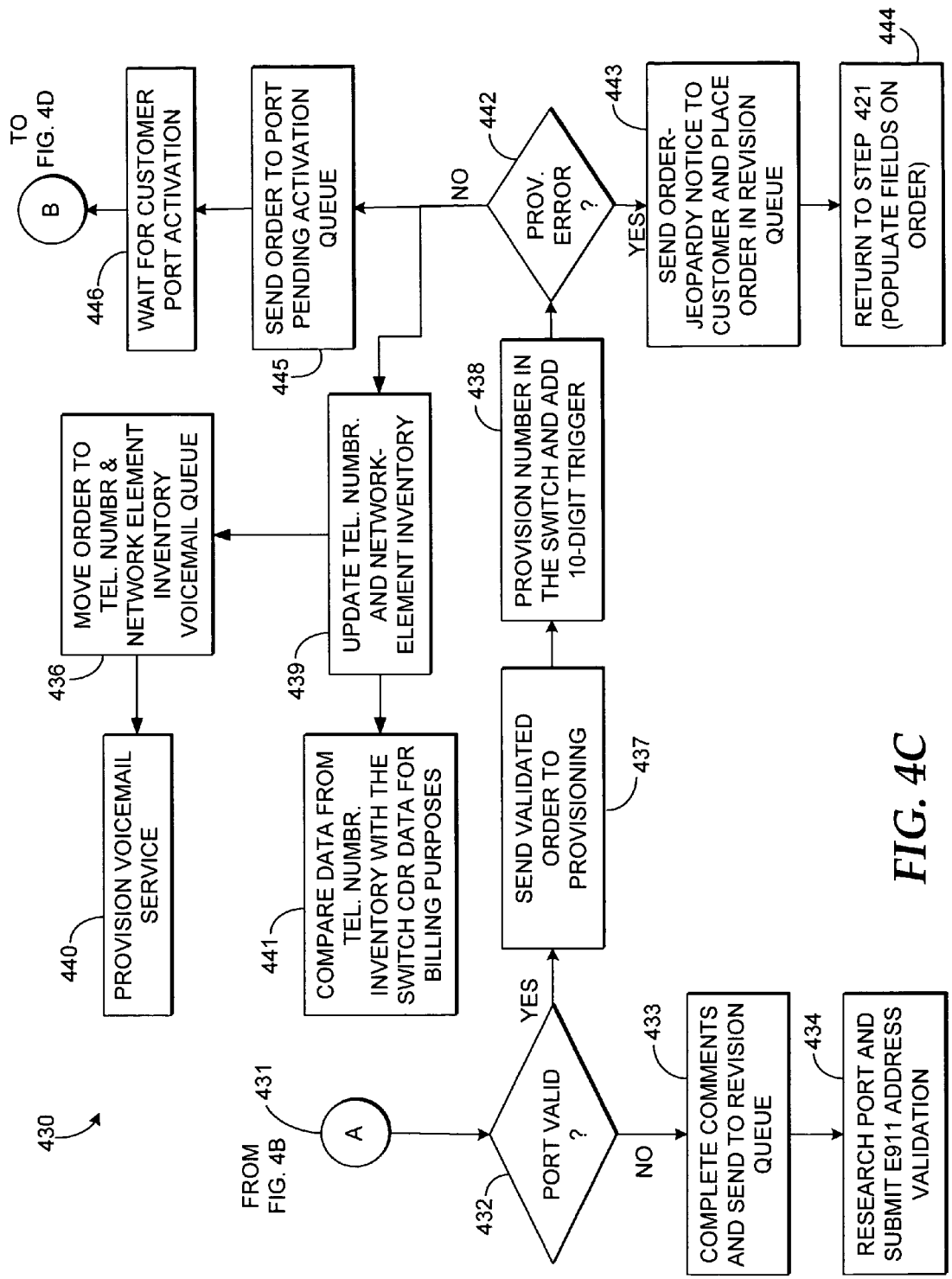

Referring now to FIG. 4C, which continues to depict an illustrative flow of processing for a ported number order in flow diagram 430, a step 432 verifies whether the port is valid. If the port is invalid it is sent to the Revision Queue 156 at a step 433, and the E911 MSAG 118 is validated at a step 434. If the port is valid as is determined by a step 432, the order is provisioned. The validated order is sent to provisioning by a step 437 and is provisioned in the switch, and a ten-digit trigger is added at a step 438. At a step 442, a determination is made as to whether a provisioning error occurred. If there is an error, then an "order-jeopardy" notice is sent to the customer indicating that the order may not be provisioned by the due date and the order is placed in the Revision Queue at a step 443. Upon revision, processing will revert to step 421, as a step 444 shows.

Figure 4D:
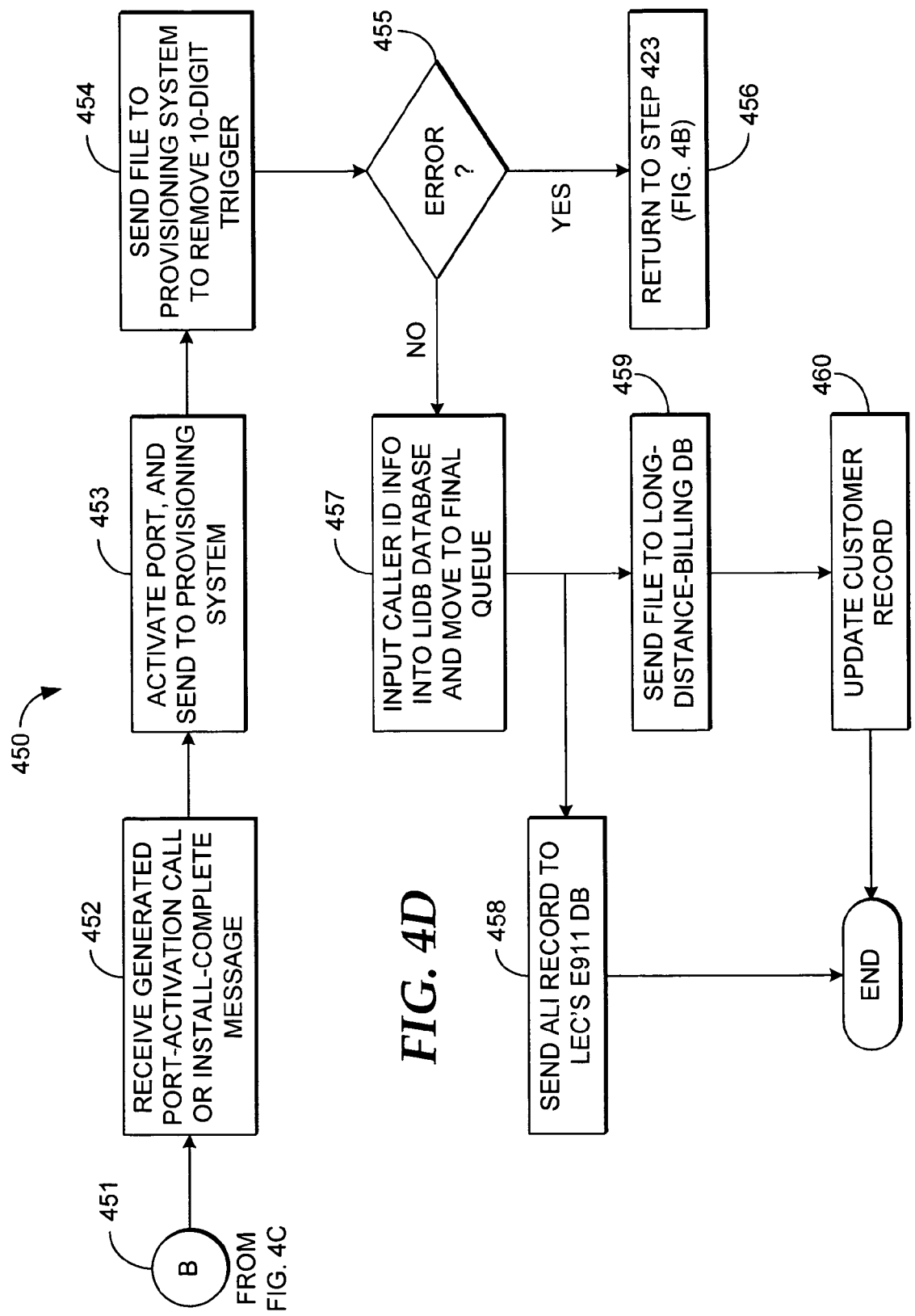
Figure 4E:
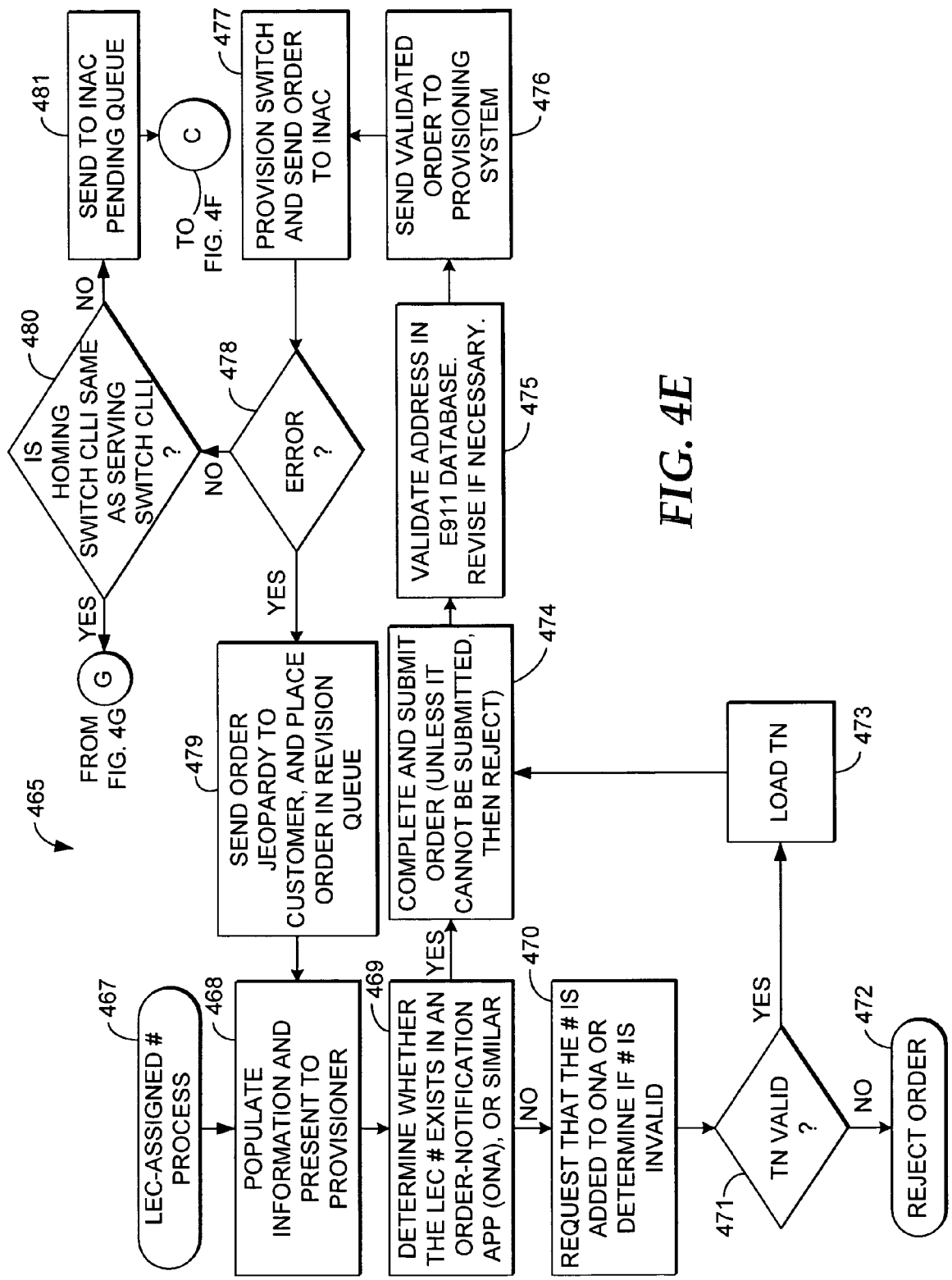

In one embodiment, if there is no error in provisioning, the telephone number is updated in the Telephone Number and Network Element Inventory 152 at a step 439. The order moves to the Telephone Number and Network Element Inventory (TNANI) 152 and Voicemail Queue 130 at a step 436, Voicemail service 130 is provisioned at a step 440, and the data from the Telephone Number Inventory is compared with the switch Call Detail Record data for billing purposes at a step 441. The order is sent to Port-Pending Activation Queue 158 at a step 445, while waiting for customer-port activation at a step 446. FIG. 4D shows processing upon receipt of port-activation call from customer at step 451.

Referring now to FIG. 4D, an exemplary flow of processing continues for a ported number order in flow diagram 450. Flow diagram 450 is the completion of the ported number processing. At a step 452, the port-activation call or install-complete message is received from the customer. The port is activated at a step 453, sent to the provisioning system, and at a step 454, the ten-digit trigger is removed. If there is an error as determined by a step 455, then processing continues to step 423 to validate the E911 address and reprocess as shown at a step 456. If there is no error the caller ID information is placed in the Line Information Database (LIDB) 126 and moved to the Final Pending Database 166 as shown at a step 457. The file is sent to the Long Distance database 154 at a step 459 and the customer record is updated at a step 460 while the Automatic Line Identification (ALI) record 160 is sent to the LEC's 911 database 118.

Referring now to FIG. 4E, a flow diagram 465 illustrates a LEC-assigned process in accordance with an embodiment of the present invention. The order information is populated and sent to provisioning at a step 468. If the LEC number does not exist in an Order Notification Application (ONA) as is determined at a step 469, then a request is made to add the number to an ONA at a step 470 or to determine whether the number is valid at a step 471. If the number is not valid, then the order is rejected at a step 472. If the number is valid, then it is loaded at a step 473. If the LEC number exists in an ONA or has been added, then a complete and submit order is shown at a step 474. If the order cannot be submitted, then it is rejected. If the order is submitted successfully, confirmation is sent to the customer and address information is validated E911 database 118 and revised if necessary at a step 475.

The validated order is sent to provisioning at a step 476, where the switch is provisioned and the order is sent to the Intelligent Network Administration Center (INAC) 124 at a step 477. If there is an error as determined at a step 478, then an order-jeopardy notice is sent to the customer indicating that the order may not be provisioned on time and the order is placed in the Revision Queue 156 at a step 479. It is then sent back to step 468 to repopulate the information and be reprocessed. If there is no error, then the homing switch Common Language Location Identifier (CLLI) is compared to the serving switch CLLI at a step 480. If they are not the same then they are sent to the INAC pending queue 124 in step 480. Further processing in this case continues in FIG. 4F at step 486. However, if both switches were the same then processing continues in FIG. 4G at step 502.

Figure 4F:
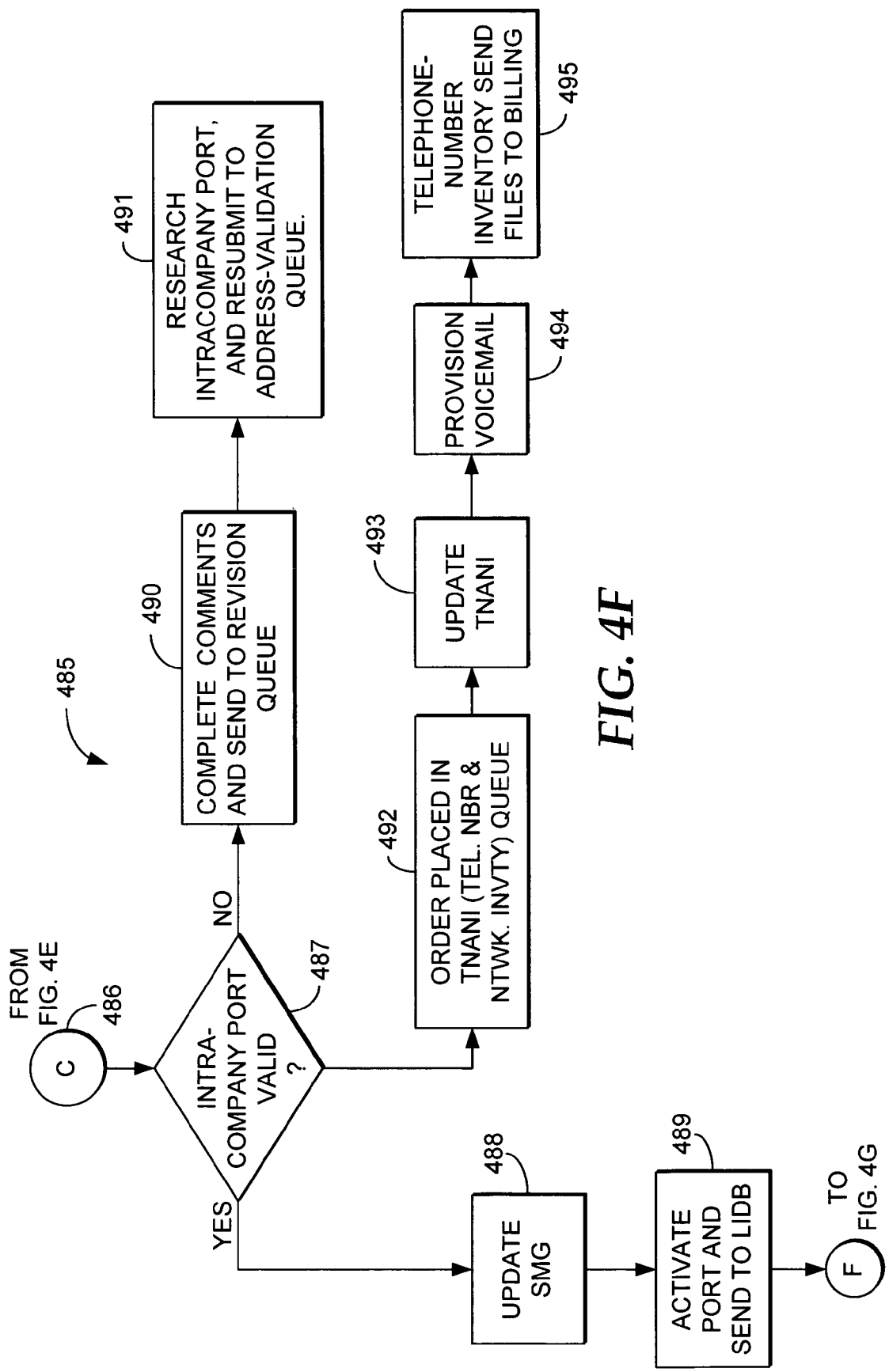
Figure 4G:
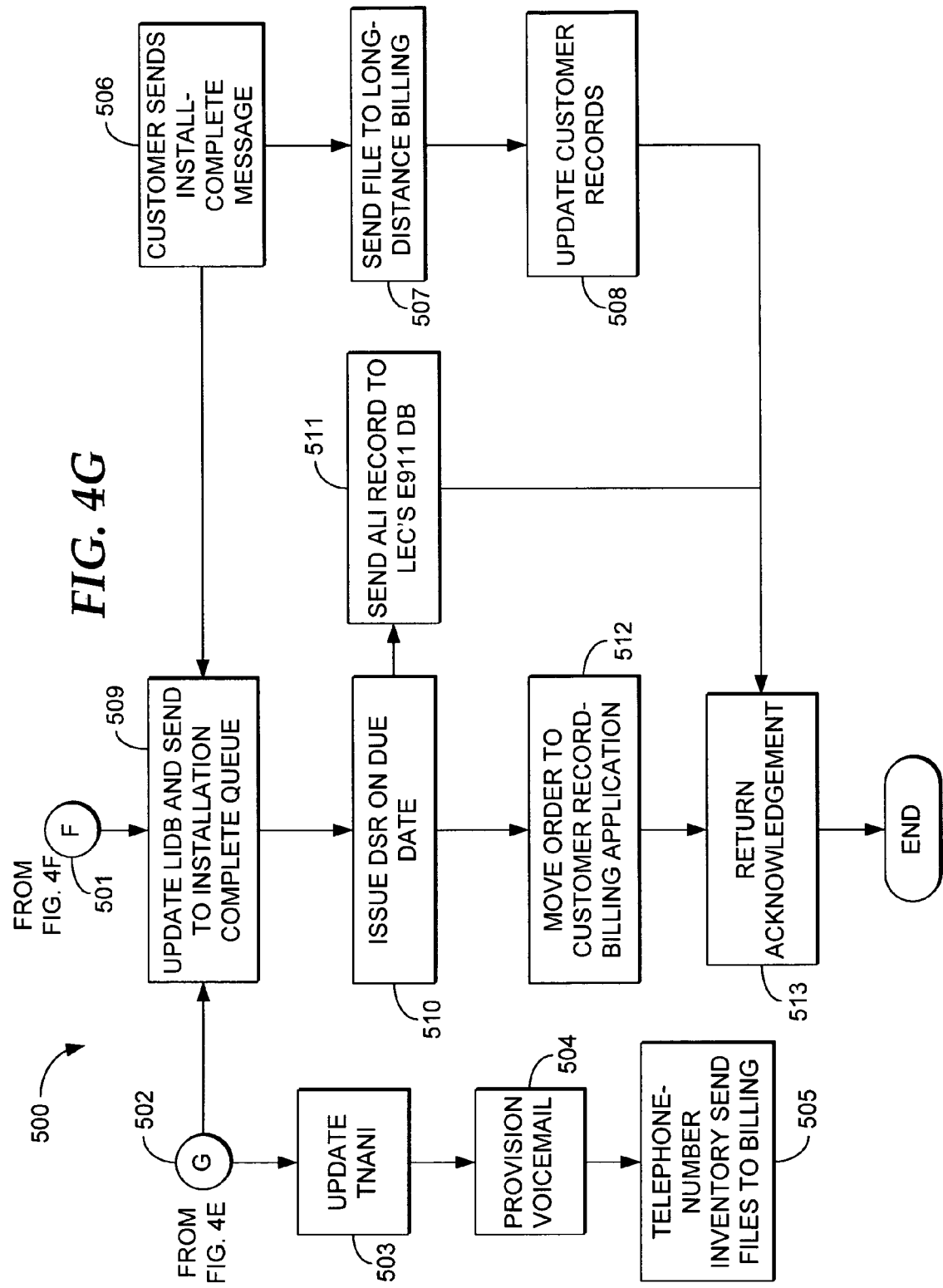

Turning now to FIG. 4F, an exemplary flow of processing continues for a LEC-assigned number order in flow diagram 485. Flow diagram 485 depicts illustrative process steps carried out after the order is sent to the INAC pending queue 124 when the CLLIs of the homing switch and serving switches are not the same. The validity of the port is checked at a step 487. If the port is valid, the Service Management Gateway (SMG) 162 is updated at a step 488, and the port is activated and sent to the LIDB 126 at a step 489. Further processing to complete this flow is shown in FIG. 4G at a step 501. If at step 487, it was determined that the port was invalid, then the order would be sent to the Revision Queue 156 at a step 490 and the port would be researched and the order resubmitted to an address-validation queue at a step 491. The order is placed in the TNANI queue 152 at a step 492, which is updated at a step 493. Voicemail is provisioned at a step 494, and billing proceeds in step 495.

Turning now to FIG. 4G, an illustrative flow of processing continues for a LEC-assigned number order in flow diagram 500. Flow diagram 500 shows the flow to complete the processing for LEC-assigned numbers. A step 502 depicts the continuation for cases where the CLLI for the homing switch and the serving switch are the same. The TNANI 152 is updated at a step 503, voicemail is provisioned at a step 504, and files are sent to billing from the telephone inventory at a step 505. An install-complete message is received from the customer at a step 506, the file is sent to long-distance billing at a step 507, and the customer records are updated at a step 508. The line-information database 126 is updated and sent to the Installation-Complete Queue 164 at a step 509. A directory service request is made at a step 510, ALI record is sent to the LEC's E911 database 118 at a step 511 and the order is moved to the customer-record-billing application at a step 512. Return acknowledgement is sent and is archived at a step 513. In cases where the port is valid, processing would have continued at step 501 and would flow to step 509.

Many different arrangements of the various components depicted, as well as components not shown, are possible without departing from the spirit and scope of the present invention. The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method for a telecommunications carrier having a legacy order-processing system to process customer orders associated with providing telephony services via a cable TV (CATV) network, the method comprising:
   receiving an indication for a request to provide or modify a voice-over-protocol telephony service;
   determining whether the order is associated with service offerings to be provided in connection with the CATV network or service offerings to be provided in connection with a telecommunications network associated with the legacy order-processing system;
   validating fields of the request to determine if there are any issues, errors, or reasons the request is rejected or unable to be completed;
   parsing the request and data associated with the request for storage in a database associated with the CATV network or the telecommunications network associated with the legacy order-processing system in response to a category of the request;
   directing the order to a supplementary processing system that is coupled to the legacy order-processing system, thereby enabling the order to be received while keeping in place the legacy order-processing system, to satisfy the order in response to determining that the order is associated with service offerings to be provided in connection with the CATV network; and
   directing the order to legacy components to satisfy the order in response to determining that the order is associated with service offerings to be provided in connection with a telecommunications network associated with the legacy order-processing system.

2. The method of claim 1, wherein the voice-over-protocol telephone service includes:
   a Voice over Internet Protocol (VoIP) service;
   a Voice over Asynchronous Transfer Mode (VoATM) service; or
   a combination thereof.

3. The method of claim 1, wherein determining whether the order is associated with offerings to be provided in connection with the CATV network includes determining whether the order will be billed to an end user by a party other that the telecommunications carrier.

4. The method of claim 1, wherein the supplementary processing system includes a data structure to receive the directed order.

5. The method of claim 1, wherein directing the order to a supplementary processing system includes denoting within the legacy system that the order is to be satisfied in connection with the supplementary processing system.

6. The method of claim 1, wherein the supplementary processing system is operable to facilitate the adding of new geographic areas.

7. The method of claim 6, wherein the supplementary processing system is further operable to define new National Emergency Number Association-2 (NENA-2) file-type filters.

8. The method of claim 1, wherein satisfying the order includes storing order information associated with the directed order.

9. The method of claim 8, wherein satisfying the order further comprises logging the order information for historical recollection.

10. The method of claim 1, further comprising:
    reporting issues in response to determining there are issues, errors, or reasons the request is rejected or unable to be completed; and
    sending an order confirmation in response to determining there are no issues, errors, or reasons the request is rejected or unable to be completed.

11. The method of claim 1, wherein the parsing further comprises:
    inserting the data into fields of the associated database.

12. The method of claim 1, wherein each of the associated databases is associated with a queue.

13. The method of claim 1, wherein fields of the request for the CATV network include alpha-numeric characters, and wherein fields of the request for the telecommunications network include a numeric format only.

14. The method of claim 1, wherein requests for the CATV network are received through an E-bonded interface.

15. The method of claim 13, further comprising:
    rejecting the order in response to a due date being invalid or an address of a customer being outside a service footprint.

* * * * *